United States Patent
Ramesh et al.

(10) Patent No.: US 10,700,736 B2
(45) Date of Patent: Jun. 30, 2020

(54) FULL DUPLEX DOCSIS CABLE MODEM ECHO CANCELLATION WITH TRAINING

(71) Applicant: MaxLinear, Inc., Carlsbad, CA (US)

(72) Inventors: Sridhar Ramesh, Carlsbad, CA (US); Kenneth Scott Walley, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 15/938,937

(22) Filed: Mar. 28, 2018

(65) Prior Publication Data

US 2018/0287659 A1  Oct. 4, 2018

Related U.S. Application Data

(60) Provisional application No. 62/477,622, filed on Mar. 28, 2017.

(51) Int. Cl.
| | |
|---|---|
| *H04B 3/20* | (2006.01) |
| *H04B 3/23* | (2006.01) |
| *H04L 12/28* | (2006.01) |
| *H04L 5/14* | (2006.01) |
| *H04J 3/06* | (2006.01) |
| *H04L 29/06* | (2006.01) |

(52) U.S. Cl.
CPC ............. *H04B 3/23* (2013.01); *H04L 5/14* (2013.01); *H04L 5/1461* (2013.01); *H04L 12/2801* (2013.01); *H04J 3/062* (2013.01); *H04L 65/10* (2013.01)

(58) Field of Classification Search
CPC ...... H04L 5/14; H04L 5/1461; H04L 12/2801
See application file for complete search history.

(56) References Cited

U.S. PATENT DOCUMENTS

| | | | |
|---|---|---|---|
| 6,408,021 B1 * | 6/2002 | Mehrabanzad | H04B 3/238 370/286 |
| 6,965,578 B1 * | 11/2005 | Kappes | H04B 3/23 370/286 |
| 2018/0205532 A1 * | 7/2018 | Chapman | H04L 5/143 |

* cited by examiner

*Primary Examiner* — Abdelnabi O Musa
(74) *Attorney, Agent, or Firm* — Maschoff Brennan

(57) ABSTRACT

Systems and methods are provided for full duplex DOCSIS cable modem echo cancellation with training. During reception of downstream signals, echo effects on downstream signals may be determined, with at least some of the echo effects corresponding to concurrently transmitted upstream signals. Echo cancellation corrections may be determined based on the determined echo effects, and the echo cancellation corrections may be applied during processing of the downstream signals. The echo cancellation corrections may include one or both of ACI (adjacent channel interference) cancellation corrections and ALI (adjacent leakage interference) cancellation correction. The echo cancellation may include or be based on preforming echo cancellation training, during active communication and based on one or both of the downstream signals and the upstream signals.

20 Claims, 7 Drawing Sheets ously, the term "module" may, for example, refer to a physical electronic components (e.g., hardware) and any software and/or

FULL DUPLEX DOCSIS CABLE MODEM ECHO CANCELLATION WITH TRAINING

CLAIM OF PRIORITY

This patent application makes reference to, claims priority to and claims benefit from U.S. Provisional Patent Application Ser. No. 62/477,622, filed on Mar. 28, 2017. The above identified application is hereby incorporated herein by reference in its entirety.

TECHNICAL FIELD

Aspects of the present disclosure relate to communications. More specifically, certain implementations of the present disclosure relate to full duplex (FDX) DOCSIS cable modem (CM) echo cancellation (EC) with training.

BACKGROUND

Certain issues may exist with conventional approaches for handling cable communications. In particular, conventional approaches for handling echo in cable networks, if any existed, may be costly, cumbersome, and/or inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for full duplex DOCSIS cable modem echo cancellation training, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Figure 1A:
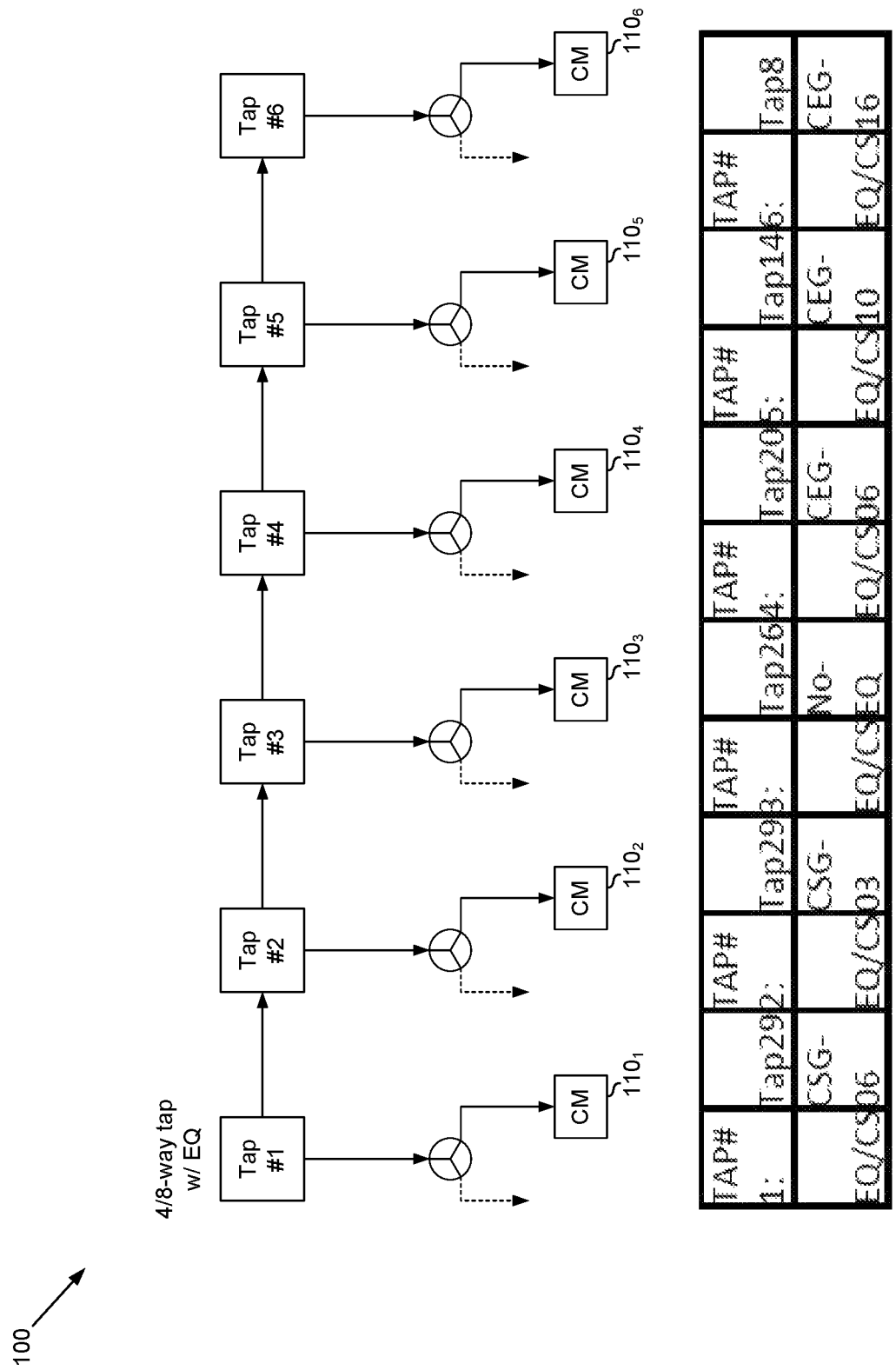
FIG. 1A illustrates an example cable network in which echo may occur.

FIG. 1A illustrates an example cable network in which echo may occur. Shown in FIG. 1A is a cable network (or portion thereof) 100.

The cable network 100 may comprise suitable hardware and/or software resources for supporting communication of signals over a cable-based backbone, particularly in compliance with one or more cable standards. For example, the cable network 100 may be configured as DOCSIS (Data Over Cable Service Interface Specification) based network. In such DOCSIS-based implementations, the cable network 100 may comprise a CMTS (cable modem termination system) that handles communication of signals to and/or from a plurality of CMs (cable modems). In this regard, the CMs may represent client devices in a DOCSIS network—e.g., typically deployed within customers' premises, and the CMTS represents the network-side controller. In the portion of the cable network 100 shown in FIG. 1A, six CMs ($110_1$-$110_6$) are shown. In this regard, CMs $110_1$-$110_6$ are connected to cable backbone via corresponding taps (taps 1-6), with the CMTS (not shown) on the other end of the cable backbone. Each of the taps 1-6 may be a CS/EQ 4/8-way tap.

The cable network 100 may be configured as FDX (full duplex) DOCSIS network. In this regard, with FDX based implementation, the cable network 100 may support overlapped upstream (US) and downstream (DS) signals. In various implementations, the CMs may operate in FDD (frequency division duplex) only, whereas the CMTS may operate in FDX (full duplex) with cancellation of DS signal leaking into US receive path.

Such FDX based arrangement may introduce certain issues, however. For example, upstream transmissions may introduce interference (e.g., echo based) into the downstream side at the CMs. An example signal profile at a particular tap (e.g., tap 6) is shown in FIG. 1B, to illustrate possible effects of US transmission on DS signals.

Figure 1B:
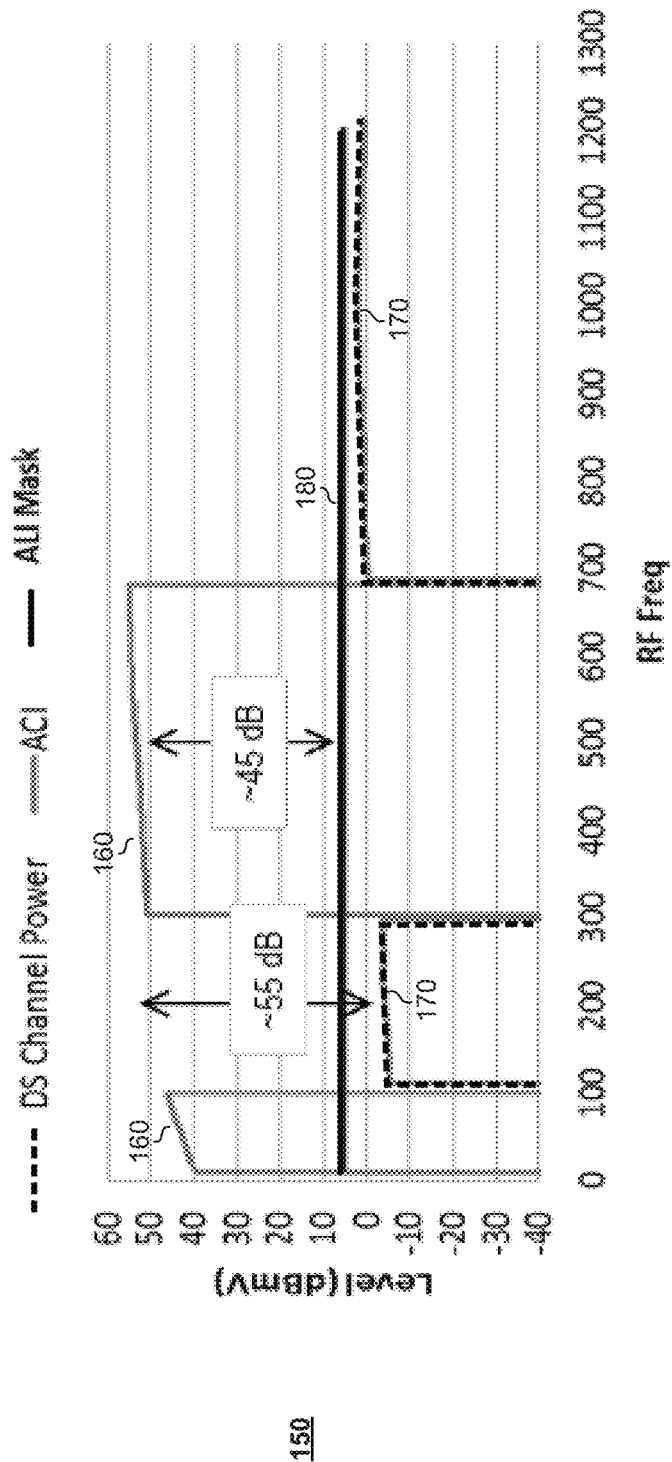
FIG. 1B illustrate an example radio frequency (RF) signal profile at a cable modem in a cable network.

FIG. 1B illustrate an example radio frequency (RF) signal profile at a cable modem in a cable network. Shown in FIG. 1B is radio frequency (RF) signal profile 150.

The signal profile 150 represents an example signal transmission/reception profile at a particular point in a cable network that uses FDX (full duplex) based communication. For example, the signal profile 150, as shown in FIG. 1B, may correspond to tap 6 in the cable network 100 of FIG. 1A. Signal profile 150 depicts graphs for a downstream (DS) signal 170, as well as ACI (adjacent channel interference) 160 and ALI (adjacent leakage interference) 180 associated with upstream (US) signals, which may affect the DS signal.

In this regard, the ACI may represent interference from a different frequency, stronger than wanted signal, which may cause receiver de-sense, whereas the ALI may represent interference is co-channel with wanted signal, from out-of-band transmit leakage. As illustrated in FIG. 1B, effects of US signals on the DS signals may be substantial. For example, US signal to DS signal power at the CM can be as high as ~55 dB. Thus, self-ACI and ALI may completely degrade the DS signal.

Accordingly, in various implementations in accordance with the present disclosure, measures are taken to address some of the potential interferences that may occur in the CMs. For example, EC (echo cancellation) may be used to address at least some of these potential interferences in the CMs. In this regard, EC may be used to cancel at least some of the transmit interference (effects of the US transmission) into particular receive signals (e.g., the desired DS signals). The EC may be configured to meet particular targets. For example, with reference to the signal profile 150 illustrated in FIG. 1B, the echo cancellation targets may be ~50 dB ACI, ~55 dB ALI, to ensure receiving 4K QAM DS.

In various example implementations, echo cancellation (EC) may be incorporated into FDX CMs. Use of EC in the CM may be desirable as it may allow for avoiding switched filter costs and concerns, while offering flexibility for diverse FDX spectrum evolution roadmaps with single CM design.

In an example implementation, EC implemented in CM in accordance with the present disclosure may not require use of special training sequences, as it may be disrupt existing CMs for EC training may not be desirable. Rather, CMs may be configured to train on live signal (e.g., only ACI based training may be needed, as described below).

Figure 2:
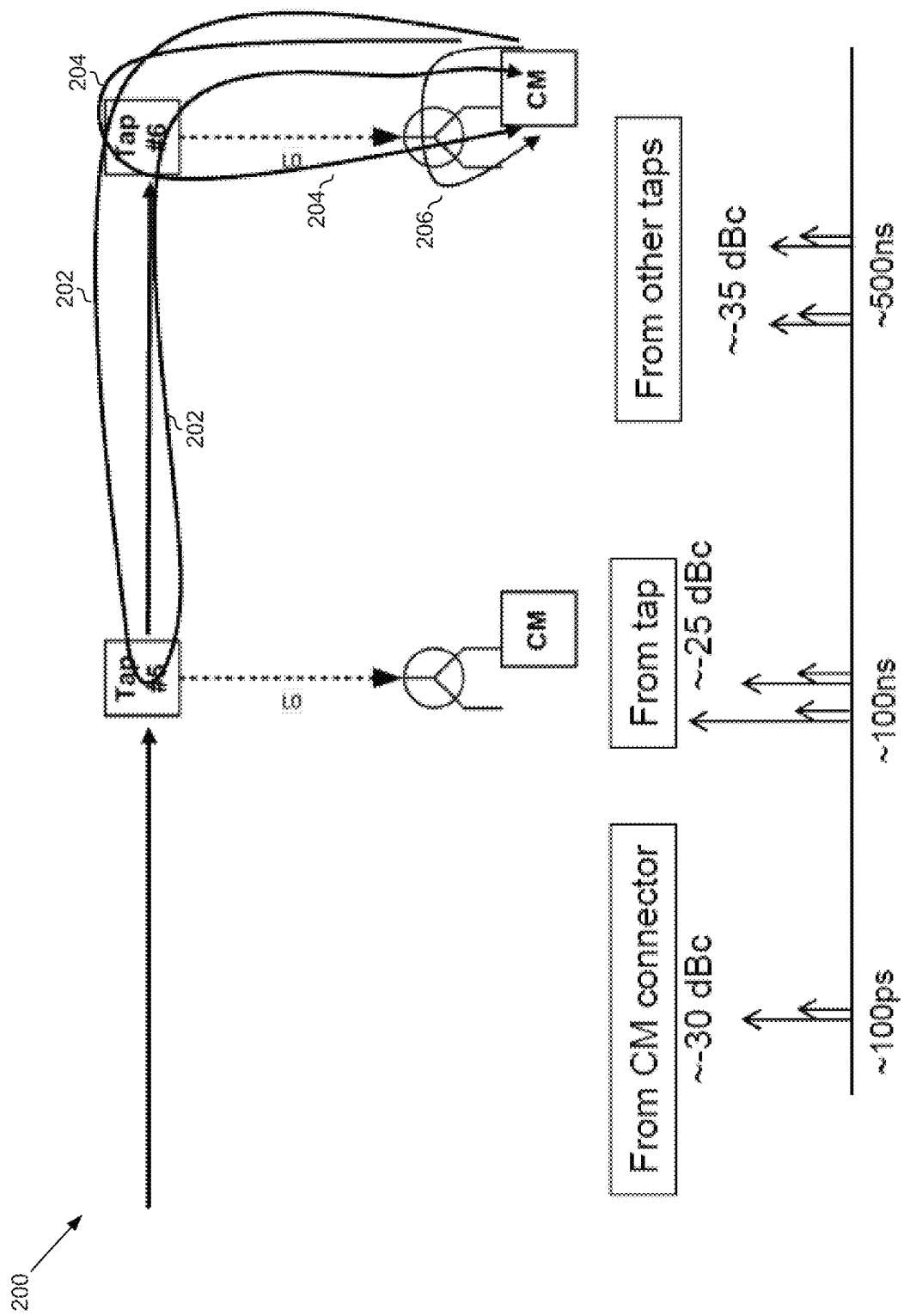
FIG. 2 illustrates example full duplex echo profile at a cable modem in a cable network.

FIG. 2 illustrates example full duplex echo profile at a cable modem in a cable network. Shown in FIG. 2 is an example echo profile 200.

The echo profile 200 represents an example echo scenario when using FDX (full duplex) at CM in a cable network. In this regard, echo profiles may be quite complex due to multitude of sources of the echo signals—e.g., reflections off multiple connectors and taps. The echo profile 200, as shown in FIG. 2, may correspond to echo occurring at the CM connected to tap 6 in the cable network 100 of FIG. 1A. The echo profile 200 may comprise three forms or types of echo signals: echo signal 202 representing effects of echo from other taps (e.g., from tap 5), echo signal 204 representing effects of echo from other the tap to which the CM is connected (i.e., tap 6), and echo signal 206 representing effects of echo from the CM connector (to the tap). Thus, overall echo power-delay profile may comparable to that seen in FDX node.

Because pure RF cancellation may not be practical, in various implementations circuitry may be added to handle the echo cancellation in optimal manner. For example, processors, such as DSPs (digital signal processors), may be used to perform any functions for handling the required echo cancellation. These functions may include A/D (analog-to-digital) and/or D/A (digital-to-analog) conversions. An example circuitry for handling EC cancellation is shown in FIG. 3.

Figure 3:
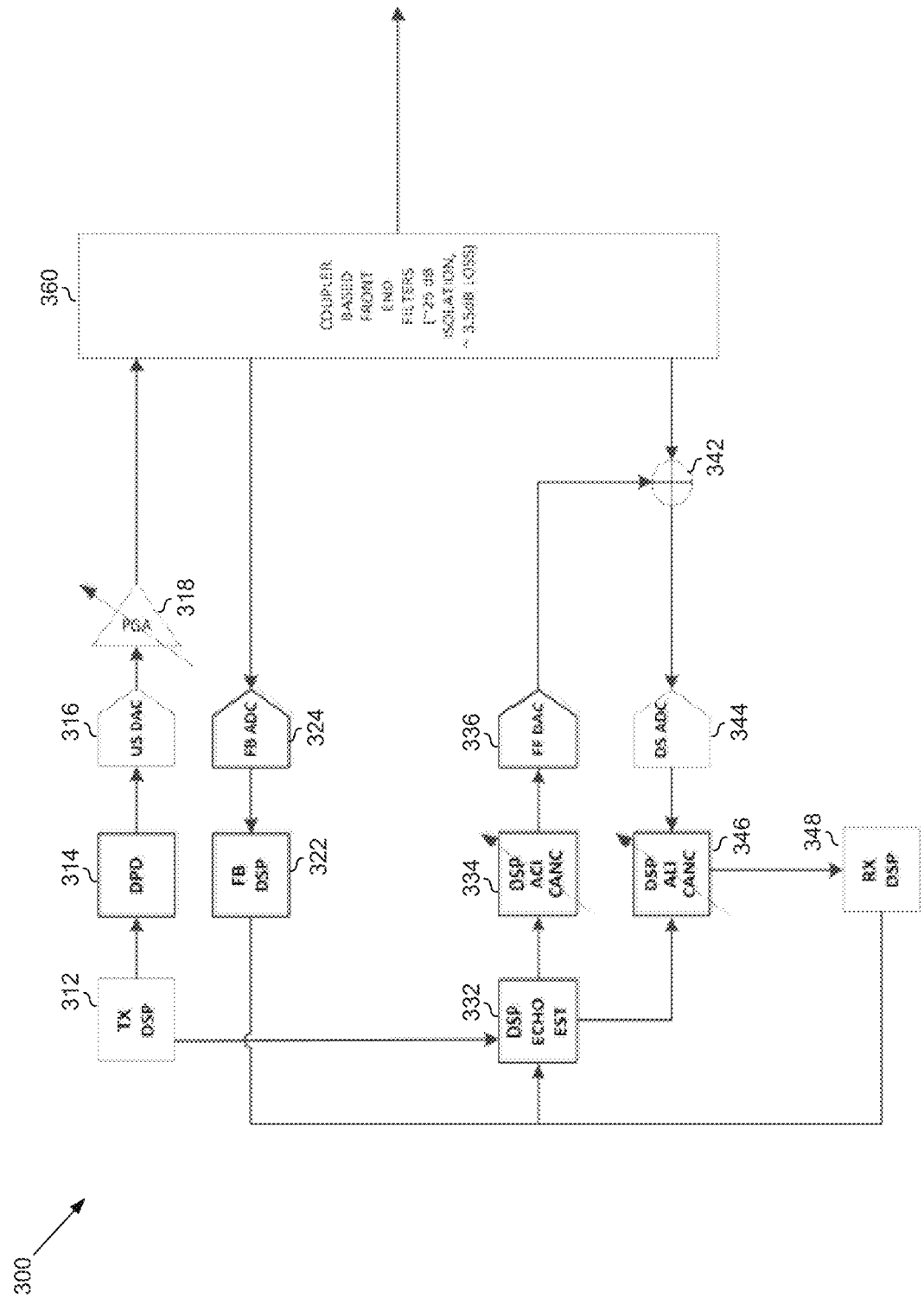
FIG. 3 illustrates example circuitry for full duplex DOCSIS cable modem echo cancellation training.

FIG. 3 illustrates example circuitry for full duplex DOCSIS cable modem echo cancellation training. Shown in FIG. 3 is a cable modem (or portion thereof) circuitry 300.

The cable modem circuitry 300 may comprise suitable circuitry for implementing various aspects of the present disclosure. In particular, the cable modem circuitry 300 may be configured for supporting full duplex (FDX) based communications with echo cancellation. In this regard, the cable modem circuitry 300 may comprise suitable circuitry for processing downstream (DS) and upstream (US) signals, and for performing echo cancellation when necessary (e.g., during FDX communications), and additionally performing echo cancellation training using live signals (rather than specialized signals).

For example, in the example implementation shown in FIG. 3, the cable modem circuitry 300 may comprise a coupler 360 for coupling (e.g., routing into/from CM connector) US and DS signals, a US processing path comprising transmit DSP (digital signal processor) 312, a DPD (digital pre-distortion) circuit 314, a US DAC (digital-to-analog converter) 316 and a PGA (programmable-gain amplifier) 318, and a DS processing path comprising a combiner 342, a DS ADC 344, a DSP ALI (adjacent leakage interference) canceller 346, and a receive DSP 348.

The cable modem circuitry 300 may additionally comprise dedicated circuits for handling echo cancellation in accordance with the present disclosure. For example, as shown in FIG. 3, the cable modem circuitry 300 comprise a FB (feedback) ADC (analog-to-digital converter) 324 and FB DSP 322, and a DSP echo estimator 332, DSP ACI (adjacent channel interference) canceller 334, and a DAC (digital-to-analog converter) 336. In this regard, such circuits are typically not used in CMs but may be incorporated thereto to provide the described echo cancellation and/or training required thereof. Nonetheless, in some implementation, at least some of the functions described with respect to these additional circuits may be performed by suitable existing circuits.

In an example use scenario corresponding to the example implementation shown in FIG. 3, the cable modem circuitry 300 may be configured to handle FDX communications, and to perform any required echo cancellation (EC) during such communications. Further, to do so, the cable modem circuitry 300 may perform dynamic echo cancellation (EC) training using live signals/data. For example, during FDX communications, DS data, PLC (Phy Link Channel), NCP (Next Code Pointers) may be corrupted while US is at full power, when no EC is used. However, BPSK (Binary Phase Shift Keying) pilots may still be received, and thus may be used to train EC. The EC training may be performed, using US and DS signals, such as via the DSP echo estimator 332.

In an example implementation, during EC training sequence, ALI may be added to EC training sequence for ALI coefficient estimation, and training signal power ramp may be performed. In this regard, training signal power ramp may start with lower training signal TX levels, to allow data, PLC and NCP reception through EC training.

In some instances, combined EC training and IG (Interference Group) sounding may be used. In this regard, probe pattern may be suited for training CM EC circuitry, while also determining IGs in network. The BPSK pilots in DS may allow decision aided training. In this regard, slicer error signal may have DS component removed, so residue is all US (need to de-rotate and de-scale for DS equalizer). An example use of training sequence during EC training is shown in FIG. 4.

Accordingly, the cable modem circuitry 300 may make echo cancellation related corrections while handling upstream (US) signals and downstream (DS) signals. For example, the DSP echo estimator 332 may be perform echo estimation. In this regard, the DSP echo estimator 332 may estimate echo (or effects thereof) based on information from the receive DSP 348 (e.g., relating to processed DS signals, which may include any echo effects reflected therein). Further, the DSP echo estimator 332 may also estimate echo (or effects thereof) based on feedback information relating to the US signals. For example, the feedback may be obtained based on signals (or copies thereof) obtained from the coupler 360, which may be subject to A/D conversion via the FB ADC 324, and then processed in the FB DSP 322, which may then provide the corresponding feedback information to the DSP echo estimator 332.

Based on the echo estimation, the DSP echo estimator 332 may determine corresponding echo cancellation corrections, which may include ALI (adjacent leakage interference) cancellation and/or ACI (adjacent channel interference) cancellation. The ALI cancellation may be applied via the DSP ALI canceller 346, which may be incorporated into the DS processing path. The ACI cancellation may be applied in the analog domain, and as such, it requires first a D/A conversion via the DAC 336, with the output of the DAC 336 being added via combiner 342 into the DS signals, received from the coupler 360.

Figure 4:
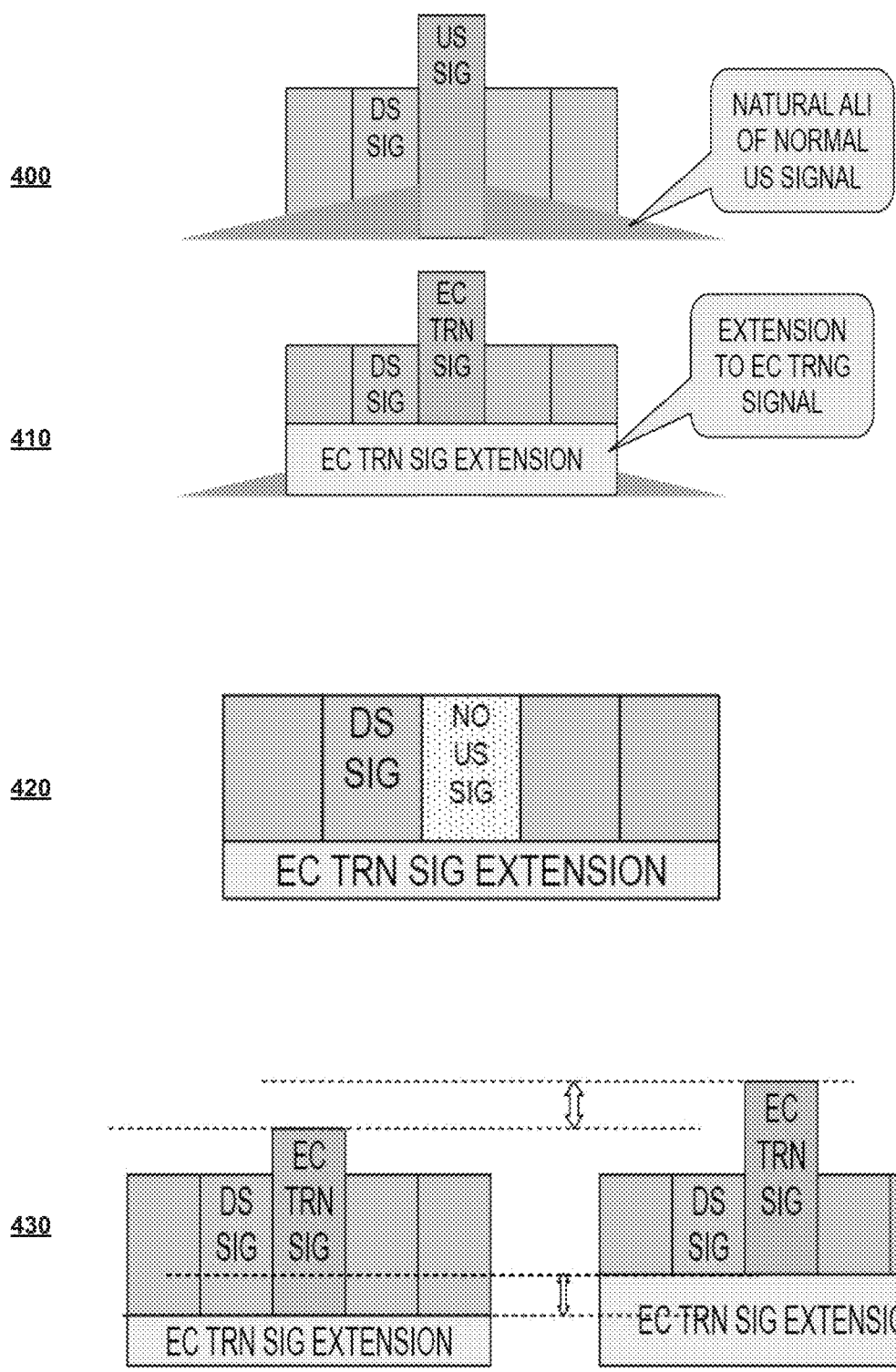
FIG. 4 illustrates an example training sequence during use of full duplex DOCSIS cable modem echo cancellation training.

FIG. 4 illustrates an example training sequence during use of full duplex DOCSIS cable modem echo cancellation training. Shown in FIG. 4 are charts representing signal structures during EC training sequence (e.g., in circuitry 300).

Natural ALI of normal US signals is shown in chart 400.

Addition of EC training signal extension into US signal is shown in chart 410. In this regard, the EC training signal may be augmented, to improve estimation of ALI echo cancellation coefficients.

As shown in chart 420, the EC training sequence extension may cover all scattered pilot locations (e.g., ALI canceller based on SP slicer errors); may be at or above thermal noise level, such as for faster training convergence; and may be generated with clock synchronized to DS signal (e.g., coherent with pilots). The EC training sequence may be transmitted by CM without grant from CMTS, and may be used for background EC, when DS signal has SNR margin.

The EC training sequence may be used to train the EC related components and/or functions in the CM, as shown in chart 430. In this regard, EC training signal and extension may be ramped in steps, to allow EC training without major disruption to DS RX signal. Once cancellation coefficients are updated for each level, training signal is raised by another step. Lower order and more downstream (DS) PHY profile may be chosen for higher ALI immunity during training. Alternatively, lower EC training signal level may be selected for same purpose.

Figure 5:
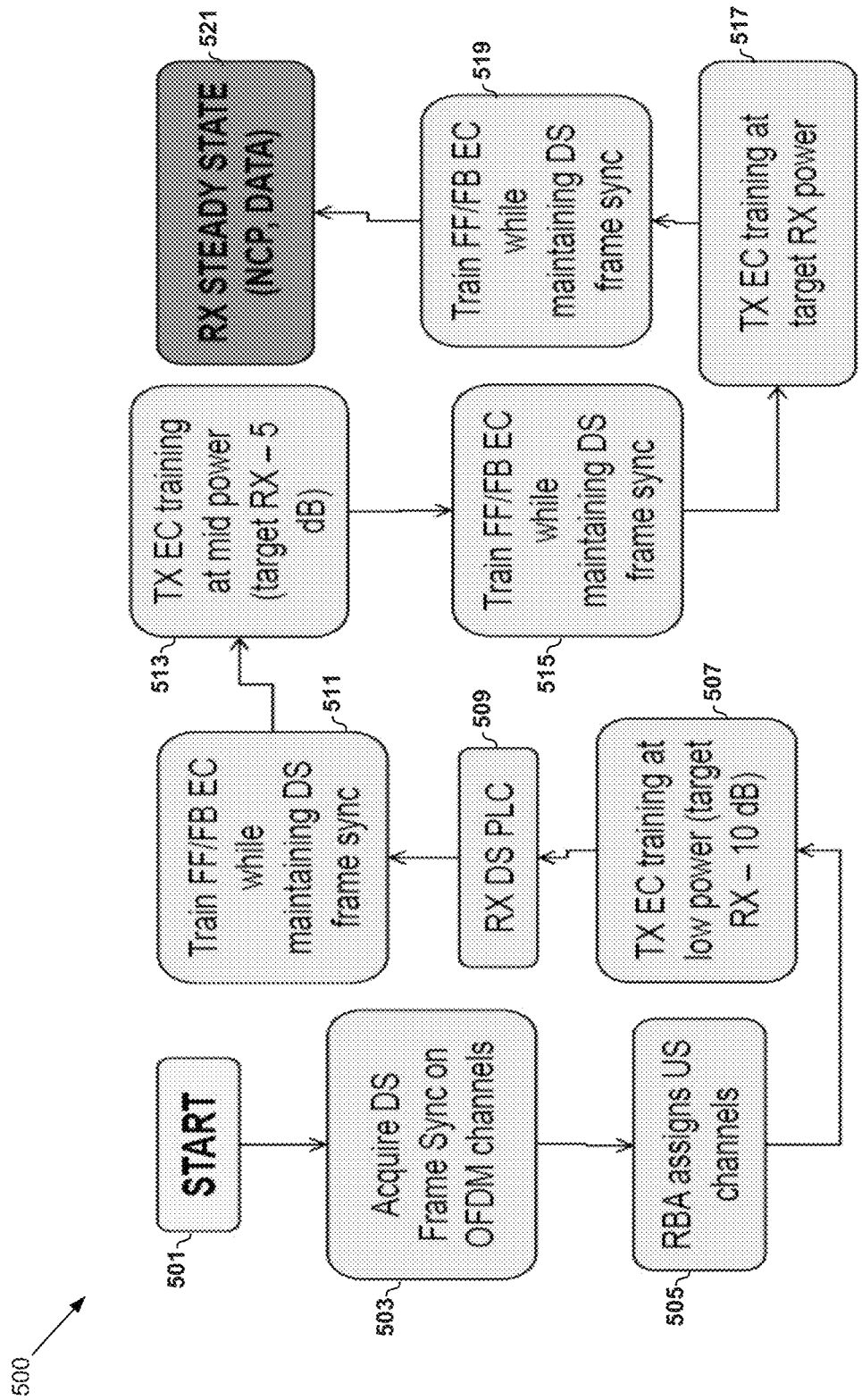
FIG. 5 illustrates an example cable modem echo cancellation training scheme.

FIG. 5 illustrates an example cable modem echo cancellation training scheme.

Shown in FIG. 5 is flow chart 500, comprising a plurality of example steps (represented as blocks 501-521), which may be performed in a suitable system (e.g., a cable modem (CM)) for echo cancellation training. In this regard, CMTS guides CM through training procedure, which may comprise raising US TX (transmit) power in steps up to target RX (receive) power, at the CM, with the CM gradually refining EC (echo cancellation) coefficients while not losing DS (downstream) OFDM frame sync. A similar scheme can be used for IG sounding, w/o disrupting DS signal.

After start step 501, the DS Frame Sync (frame synchronization) may be acquired on OFDM (Orthogonal Frequency Division Multiplexing) channels in step 503.

In step 505, the resource block assignments (RBA) may assign US channels.

In step 507, transmit EC training may be started at low power level (e.g., at target RX (receive) power of −10 dB).

In step 509, DS PLC (Phy Link Channel) may be received.

In step 511, FF/FB EC training may be done while maintaining DS frame sync.

In step 513, transmit EC training may be done at mid power (e.g., at target RX (receive) power of −5 dB).

In step 515, FF/FB EC training may be done while maintaining DS frame sync.

In step 517, transmit EC training may be performed at target power level.

In step 519, FF/FB EC training may be done while maintaining DS frame sync.

In step 521, with the EC training completed and EC being used, the receive function may be at steady state (e.g., NCP, DATA).

Figure 6:
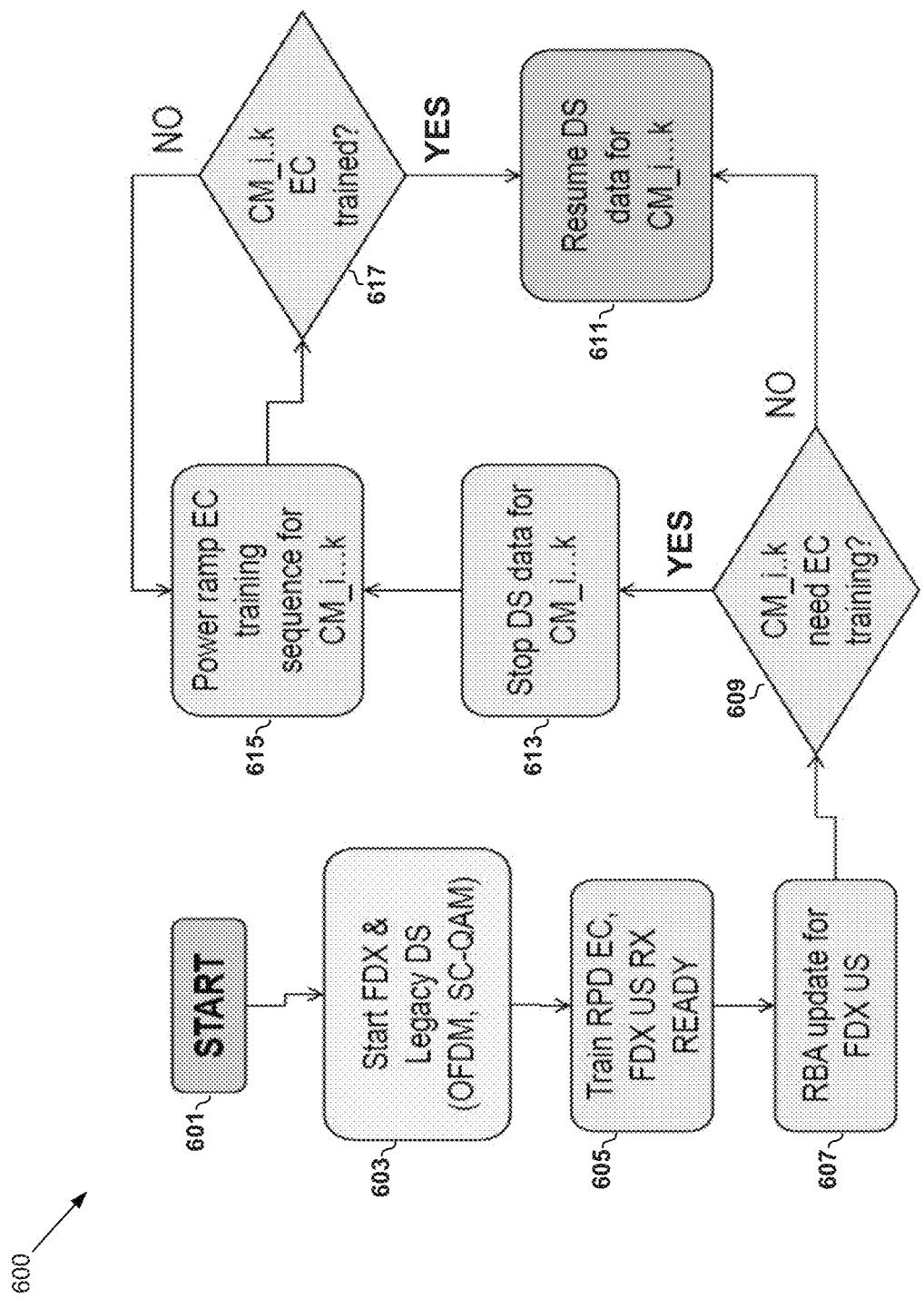
FIG. 6 illustrates an example process for handling communication at cable modem termination system (CMTS) when supporting full duplex DOCSIS cable modem echo cancellation training at cable modems (CMs).

FIG. 6 illustrates an example process for handling communication at cable modem termination system (CMTS) when supporting full duplex DOCSIS cable modem echo cancellation training at cable modems (CMs).

Shown in FIG. 6 is flow chart 600, comprising a plurality of example steps (represented as blocks 601-617), which may be performed in a suitable system (e.g., a CMTS) for supporting echo cancellation training at client device (e.g., CM) during FDX communications.

After start step 601, FDX and legacy DS communication (e.g., OFDM, SC-QAM (Single-Carrier Quadrature Amplitude Modulation), etc.) may be started in step 603.

In step 605, RDP (Remote PHY Device) EC training may be done, and FDX US receive may be ready.

In step 607, resource block assignments (RBA) may update for FDX US.

In step 609, it may be determined whether the CMs (e.g., CM_i . . . k) may need EC training. If no CM needs training, the process may jump straight to step 617; otherwise, the process proceeds to step 611.

In step 611, DS data/communications to the CMs (e.g., CM_i . . . k) may be stopped.

In step 613, power ramp EC training sequence for the CMs (e.g., CM_i . . . k) may be provided and/or performed.

In step 615, it may be determined whether the CMs (e.g., CM_i . . . k) completed EC training. If the CMs are EC trained, the process may proceed to step 617; otherwise, the process may loop back to step 613 to redo (or complete) the EC training.

In step 617, DS data/communications to the CMs (e.g., CM_i . . . k) may be resumed.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
   one or more receive processing circuits that process downstream signals;
   one or more transmit processing circuits that process upstream signals; and
   one or more echo cancellation circuits that, during concurrent communication of said downstream signals and said upstream signals:
      determine echo effects on said downstream signals, wherein at least some of said echo effects correspond to said upstream signals,
         wherein the determining comprises performing echo cancellation training during active communication, based on one or both of said downstream signals and said upstream signals, and
         wherein said echo cancellation training comprises generating an echo cancellation training sequence and applying said echo cancellation training sequence to said concurrent communication of said downstream signals and said upstream signals;
      determine echo cancellation corrections based on said determined echo effects; and
      apply said echo cancellation corrections during processing of said downstream signals.

2. The system of claim 1, wherein said one or more echo cancellation circuits determine one or both of ACI (adjacent channel interference) cancellation corrections and ALI (adjacent leakage interference) cancellation corrections.

3. The system of claim 1, wherein said one or more echo cancellation circuits, during said echo cancellation training, combine said echo cancellation training sequence with one or both of said downstream signals and said upstream signals, to generate corresponding combined signals.

4. The system of claim 3, wherein said one or more echo cancellation circuits configure one or more echo cancellation related functions based on information relating to said combined signals.

5. The system of claim 1, wherein said one or more echo cancellation circuits sets and/or adjust power of one or more signals generated or used during said echo cancellation training.

6. The system of claim 5, wherein said one or more echo cancellation circuits control setting and/or adjusting said power of said one or more generated or used signals based on effects on one or both of one or both of said downstream signals and said upstream signals.

7. The system of claim 6, wherein said one or more echo cancellation circuits, when controlling setting and/or adjusting of power of a signal generated or used during said echo cancellation training:
   set power of at least one signal to a pre-set initial value; and
   incrementally increases said power of said at least one signal while monitoring to ensure that each increase does not affect handling one or both of one or both of said downstream signals and said upstream signals.

8. The system of claim 1, wherein said one or more echo cancellation circuits determine, based on said echo cancellation training, information relating to said echo cancellation corrections.

9. The system of claim 1, wherein said one or more echo cancellation circuits determine based on said echo cancellation training, when said echo cancellation corrections comprise ALI (adjacent leakage interference) cancellation corrections, ALI echo cancellation coefficients.

10. The system of claim 1, wherein said one or more echo cancellation circuits are configured to adjust said echo cancellation training sequence based on one or more characteristics associated with said communication of said downstream signals and said upstream signals, said one or more characteristics comprising one or both of pilot locations and thermal noise levels.

11. A method comprising:
   determining echo effects on received downstream signals, wherein at least some of said echo effects correspond to concurrently transmitted upstream signals,
      wherein the determining comprises performing echo cancellation training during active communication, based on one or both of said downstream signals and said upstream signals, and
      wherein said echo cancellation training comprises generating an echo cancellation training sequence and applying said echo cancellation training sequence to said concurrent communication of said downstream signals and said upstream signals;

determining echo cancellation corrections based on said determined echo effects; and applying said echo cancellation corrections during processing of said received downstream signals.

12. The method of claim 11, wherein determining echo cancellation corrections comprises determining one or both of ACI (adjacent channel interference) cancellation corrections and ALI (adjacent leakage interference) cancellation correction.

13. The method of claim 11, comprising, during said echo cancellation training, combining said echo cancellation training sequence with one or both of said downstream signals and said upstream signals, to generate corresponding combined signals.

14. The method of claim 13, comprising configuring one or more echo cancellation related functions based on information relating to said combined signals.

15. The method of claim 11, comprising setting and/or adjusting power of one or more signals generated or used during said echo cancellation training.

16. The method of claim 15, comprising controlling said setting and/or adjusting of said power of said one or more generated or used signals based on effects on one or both of one or both of said downstream signals and said upstream signals.

17. The method of claim 16, wherein said controlling of setting and/or adjusting of said power of said one or more generated or used signals comprises:

setting power of at least one signal to a pre-set initial value; and incrementally increasing said power of said at least one signal while monitoring to ensure that each increase does not affect handling one or both of one or both of said downstream signals and said upstream signals.

18. The method of claim 11, comprising determining, based on said echo cancellation training, information relating to said echo cancellation corrections.

19. The method of claim 11, comprising determining based on said echo cancellation training, when said echo cancellation corrections comprise ALI (adjacent leakage interference) cancellation corrections, ALI echo cancellation coefficients.

20. The method of claim 11, comprising adjusting said echo cancellation training sequence based on one or more characteristics associated with said communication of said downstream signals and said upstream signals, said one or more characteristics comprising one or both of pilot locations and thermal noise levels.

* * * * *